INVENTOR.
JUAN JOSE LEMBO
BY

United States Patent Office 2,798,195
Patented July 2, 1957

2,798,195

TIME SWITCH AND SPEED VARIATOR FOR ELECTRIC MOTORS

Juan José Lembo, Buenos Aires, Argentina

Application April 16, 1954, Serial No. 423,729

2 Claims. (Cl. 318—349)

The present invention refers to improvements in speed variator means for electric motors.

It is an object of the present device to provide means controlling the cyclic operation of an electric motor which may drive, for example, a liquid-treating apparatus, a washing machine or the like.

The motor itself drives by a connection consisting of pulley and belt, or in any other manner, a pinion which, in turn, drives with displacing motion a rack which operates a first electric contact aligned with and arranged at one end of the rack to thus initiate the running of the motor at a speed slower than the normal speed for the motor, while, when said rack withdraws from said first contact and the latter closes, the running speed of the motor increases to the normal speed, and turns at that speed during a predetermined time interval, the rack moving to the extent required for the opposite end to open a second electric contact. The operation of the motor is carried out during such time interval and the electric current will be cut off, when the rack opens said second contact, thus ending the periodical cycle of operation.

The return of the rack to the starting position or the slow run of the motor is obtained by moving the pinion out of engagement with the rack which is pulled back by a spring the latter being stretched during the advance movement of the rack at normal speed.

According to the invention means are provided to determine the time which a rack takes to move from one electric contact to the other, thus regulating the duration of the operation of the machine driven by the motor, and such time is adjusted by changing the diameters of the driving pulleys secured to the shaft of the motor and to the driving shaft of the mechanical speed variator.

In its characteristic construction the speed variator is constituted by a rack meshing with a pinion which is turned by means of a speed reducing device, connected with the shaft of the motor of the machine, so that with the operation of the motor, the machine will then operate only during the time interval the rack takes to move from one contact to the opposite contact, as the rack is aligned with first and second end contacts of an electric circuit which includes a resistor or impedance for preventing the full supply of the electric current to the motor, the latter turning, under such conditions at a slow speed during a short period of time; and thereafter at a higher speed when the rack allows the respective contact to close and cuts out the impedance; finally, the motor is stopped, when the rack opens the opposite or second contact. The variator further includes spring means secured with one end to a fixed point and with the other end to the movable rack, and a handle that provides for disengaging or engaging the rack with the driving pinion.

In order that the invention may be more clearly understood and readily carried into effect, a full description thereof will be hereinafter given, of a preferred embodiment of the invention, with reference to the accompanying drawing forming part of such description.

Figure 1:
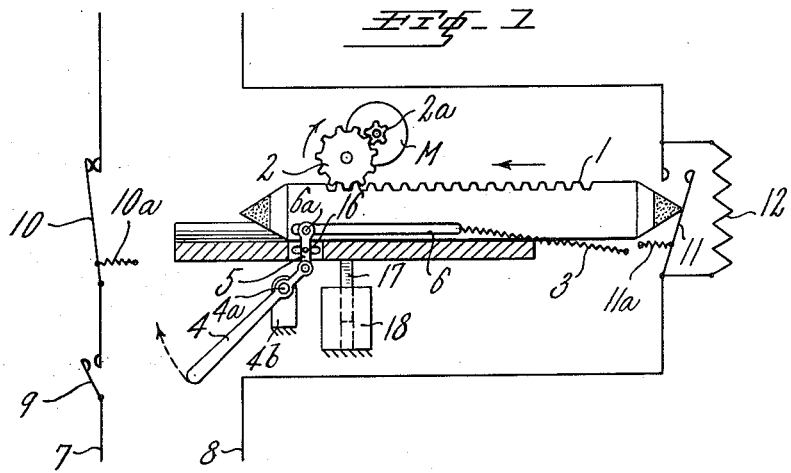
Fig. 1 is a diagrammatic view of the variator according to the invention showing said variator in starting position.

Referring now more particularly to the drawing, in Fig. 1 there are shown first and second electrical conductors or supply lines 8 and 7, respectively. The two lines are connected with and energize an electric motor M. The second line 7 includes a manually operable switch 9 for closing and opening the electric circuit at will and further includes an end switch or contact 10 which is normally held in closed position by a spring 10a.

The first supply line 8 includes a first end switch or contact 11 which is normally urged toward closed position by a spring 11a. Across contact 11 there is positioned impedance means 12 which permits the flow of current through the circuit even when contact 11 is open, so that the motor can operate at a first speed.

Figure 2:
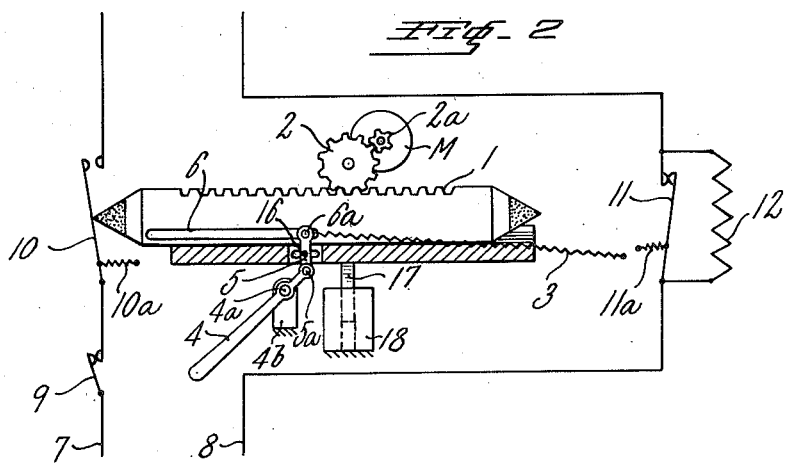
Fig. 2 is a view similar to that of Fig. 1 but showing the variator in the stop position.

A pinion or gear 2 is driven via a gearing 2a by motor M at a proportional speed. A rack member 1 having electrically insulated ends is disposed to move along guide track 15 between contacts 10 and 11 and is shown meshing with the gear or pinion 2 (Figs. 1 and 2), the right hand end of the rack member being so positioned that contact 11 is in open position. Rack 1 is further under the influence of spring 3 to keep contact 11 open. When closing switch 9 rotation of motor M and pinion 2 causes rack 1 to be displaced to the left toward contact 10.

Before rack member 1 advances sufficiently toward the left contact 11 will first be closed under the influence of its spring 11a, and increased current is supplied to the motor M and the latter rotates at a second speed greater than the first speed. This second speed of rotation of the motor is continued until the rack member has advanced to the left so far that the rack member 1 interrupts the flow of current to the motor by opening contact 10 against action of spring 10a, thereby stopping the motor.

If it is desired to avoid stoppage of motor M the following operation may be initiated.

Figure 3:
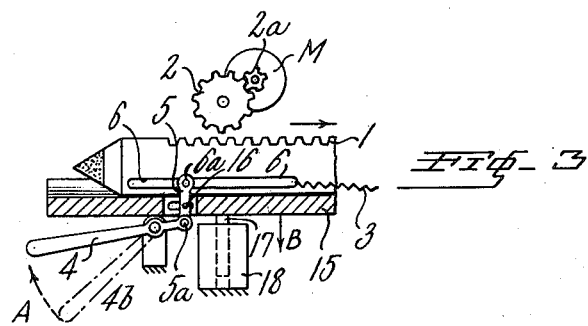
Fig. 3 is a diagrammatical view of the guide means for the rack of the variator.

A lever having a pair of arms 4, 5 is pivoted at 4a on a fixed bearing 4b and is connected through pin 6a on arm 5 with slot 6 provided in the rack 1. By swinging arm 4 of the lever in the direction of the arrow A (Fig. 3) the rack 1 may be disengaged from the pinion 2.

In such case rack 1 which is guided for lengthwise movement on the support 15, is displaced together with said support through pin and slot connection 16 in downward direction (arrow B), whereby support 15 is guided vertically by a bar 17 riding in a fixed bearing 18.

Upon re-engaging the rack member with the pinion, if switch 9 remains closed, the motor will turn at the first speed again since contact 11 is opened, due to movement of rack 1 under action of spring 3 toward the right in the direction against end contact 11. The rack member 1 will then be advanced to the left through engagement with pinion 2 which is again rotated at a slower or first speed proportional to that of the motor, until due to its movement rack member 1 causes again closing of contact 11.

Upon operating the lever arm 4 to disengage the rack and pinion, the rack is returned by spring 3 to the position where contact 11 is now opened, contact 10 closing under the action of its spring, and the device is ready to repeat the cycle.

The time during which the motor operates at the second speed will depend upon the length of the rack, the speed of the motor and the ratio between the pinion and the motor speeds, and these can be designed to adjust the time interval to any predetermined value.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A speed variator for an electric motor adapted to be energized by first and second supply lines comprising, first and second normally closed contacts disposed, respectively, in said first and second supply lines, impedance means shunted across said first contact whereby said motor will be energized in series with said impedance means for operation at a first speed when said first contact is open, gear means driven by said motor at a speed proportional to that of the latter, rack means cooperable with said gear means and disposed between said first and second contact, said rack means engaging and opening said first and second contacts respectively, operable means urging said rack means normally into a position wherein said first contact is open, and lever means operatively connected with said rack means for moving the latter into and out of engagement with said gear means, whereby upon actuation of said lever means for engagement of said rack means with said gear means when said first contact is open, said gear means driven by said motor causes said rack means to advance toward said second contact until said rack means disengages said first contact, the latter then being closed by said operable means to thereby drive said motor at a second speed, further advance of said rack means serving to open said second contact and de-energize said motor.

2. A speed variator according to claim 1, wherein said first and second contacts are arranged in alignment with said rack means.

References Cited in the file of this patent

UNITED STATES PATENTS 2,510,690    Forsberg _____ June 6, 1950